United States Patent [19]
Uozumi et al.

[11] 3,733,928
[45] May 22, 1973

[54] SPEED CHANGE GEAR DEVICE

[75] Inventors: Sumio Uozumi, Toyota; Koichiro Kirosawa, Kariya, both of Japan

[73] Assignee: Toyota Jidosha Kogyo Kabushika Kaisha, Aichi-ken, Japan

[22] Filed: June 2, 1970

[21] Appl. No.: 42,661

[30] Foreign Application Priority Data

June 3, 1969 Japan..................................44/42929

[52] U.S. Cl.....................................74/753, 74/763
[51] Int. Cl..............................................F16h 57/10
[58] Field of Search..................................74/753, 763

[56] References Cited

UNITED STATES PATENTS

| | | | |
|---|---|---|---|
| 1,037,808 | 9/1912 | Trowbridge | 74/763 |
| 1,721,123 | 7/1929 | Kamper | 74/763 |
| 2,371,574 | 3/1945 | Swennes | 74/763 X |
| 2,571,448 | 10/1951 | Hobbs | 74/763 |
| 2,856,796 | 10/1958 | Miller | 74/763 |
| 3,482,469 | 12/1969 | Mori | 74/763 |
| 3,010,343 | 11/1961 | Orr et al. | 74/753 |
| 3,425,300 | 2/1969 | Ohya et al. | 74/763 |

*Primary Examiner*—Arthur T. McKeon
*Attorney*—Harry G. Shapiro

[57] ABSTRACT

A speed change gear device which comprises a relatively small number of planetary gears and associated parts and which is especially applicable to the transmission mechanism of a smaller-sized automotive vehicle. The speed change gear device employs additional brake means to fix an input member of a planetary gear train to the gear case to furnish a greater speed change ratio or a greater number of speed change steps without increasing the number of gears in the planetary gear train.

6 Claims, 27 Drawing Figures

SPEED CHANGE GEAR DEVICE

BACKGROUND OF THE INVENTION

1. Field of the Invention

This invention relates to a speed change gear device, and more particularly to a speed change gear device which comprises an input shaft and an output shaft concentrically disposed within a gear case, first and second clutch means disposed between said input shaft and said output shaft and connected to said input shaft, and a planetary gear train disposed between said input and output shafts and including a first and a second input gear member connected to said first and second clutch means, and an output gear member connected to said output shaft.

2. Description of the Prior Art

In order that a great accelerating force or tractive force may be obtained with a vehicle having a prime mover of small output, the reduction ratio of the speed change gears must be increased. In other word, the number of speed change gears must be increased. With a speed change gear device having planetary gears, it has generally been necessary to increase the number of the planetary gears in a composite or single planetary gear train and accordingly the number of mating members in order to increase a certain number of speed change steps by one step.

SUMMARY OF THE INVENTION

The object of the present invention is to provide a speed change gear device which eliminates the need to increase the number of planetary gears or to substantially increase the number of other parts and which is especially applicable to the transmission mechanism of a smaller-sized automotive vehicle.

According to the present invention, there is provided a speed change gear device which comprises an input shaft and an output shaft concentrically disposed within a gear case, first and second clutch means disposed between said input shaft and said output shaft and connected to said input shaft, and a planetary gear train disposed between said input and output shafts and including a first and a second input gear member connected to said first and second clutch means, and an output gear member connected to said output shaft, characterized by the provision of first and second brake means for fixing said first and second input gear members respectively to said gear case to selectively operate said clutch means and said brake means, whereby said output shaft is provided with a combination of speed change ratios having a required number of speed change steps.

BRIEF DESCRIPTION OF THE DRAWINGS

FIG. 15 is a chart illustrating the operational sequence of the clutch means and brake means in various speed change steps according to the first to 10th embodiments;

FIG. 16 is a chart illustrating such operational sequence according to the 11th and 12th embodiments;

FIG. 17 is a chart illustrating such operational sequence according to the 13th and 14th embodiments;

FIG. 18 is a cross-sectional view showing the left-hand portion of the first and second embodiments;

FIG. 19 is a cross-sectional view showing the right-hand portion of the first, third, fifth, seventh, ninth, 11th and 13th embodiments each; and FIG. 20 is a cross-sectional view showing the right-hand portion of the second, fourth, sixth, eighth, 10th, 12th and 14th embodiments each.

DESCRIPTION OF THE PREFERRED EMBODIMENTS

The invention will now be described in connection with the accompanying drawings, in which similar numerals designate similar parts.

Figure 1:
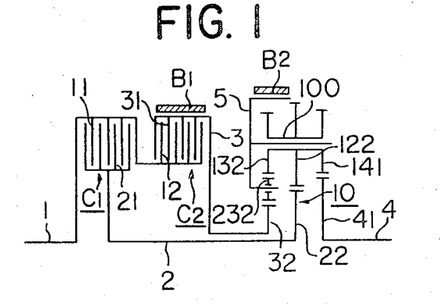
FIGS. 1 to 7 are schematic diagrams showing seven examples of power trains used with existing typical planetary gear type speed change systems.

The first and second embodiments of the present invention will first be described. Referring to FIG. 1, there is shown a first example of the power train used with the existing typical planetary gear type speed change device. This power train includes an input shaft 1, drive plates 11 splined to the input shaft 1, an intermediate shaft 2, and driven plates 21 splined to the intermediate shaft and disposed in alternate relationship with the drive plates 11. The drive plates 11 and the driven plates 21 together form a first clutch means C1. The power train further includes drive plates 12 splined to the input shaft 1, a clutch drum 3, and driven plates 31 splined to the clutch drum 3 and disposed in alternate relationship with the drive plates 12. The drive plates 12 and the driven plates 31 together form a second clutch means C2. An input sun gear 22 is secured to the intermediate shaft 2 and a reverse sun gear 32 is secured to the drum 3. A carrier 5 has an idle gear 232 mounted for rotation thereon by a pin of the carrier, the idle gear engaging the reverse sun gear 32. An output sun gear 41 is secured to an output shaft 4. A long pinion gear 100 is mounted for rotation on a pin of the carrier 5, and has teeth 132, 122 and 141 meshing with the idle gear 232, input sun gear 22 and output sun gear 41, respectively. First brake means B1 is provided for stopping the clutch drum 3, and second brake means B2 is provided for stopping the carrier 5.

Figure 8:
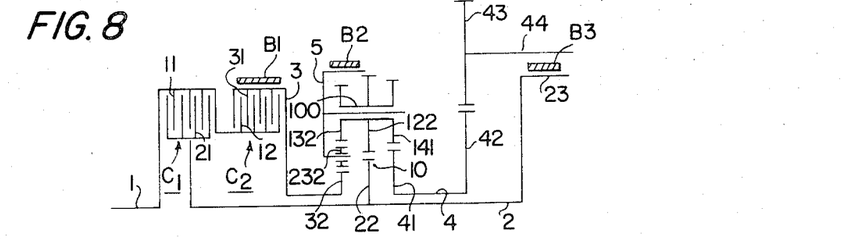
FIG. 8 is a schematic diagram showing the power train of the planetary gear type speed change device according to the first embodiment of the invention.

The first embodiment of the present invention is shown in FIG. 8. The left-hand portion of FIG. 8 is similar to FIG. 1. The right-hand or output shaft portion includes a drive gear 42 secured to the output shaft 4, a driven gear 43 meshing with the drive gear 42, an output shaft 44 secured to the driven gear 43 and connected to a propeller shaft (not shown), a drum 23 secured to the intermediate shaft 2, and a third brake means B3 for stopping the drum 23.

The first embodiment will now be described with reference to the cross-sectional view of FIG. 18, which shows the left-hand portion of the planetary gear type speed change device having the power train as shown in FIG. 8 according to the first embodiment of the present invention. Reference is also made to FIG. 19 which shows, in cross section, the right-hand portion of the first embodiment whose power train is shown in FIG. 8.

In FIG. 18, the input shaft 1 is rotatably mounted within a case 6. A clutch drum 13 is splined to the input shaft 1. The drive plates 11 are slidably splined to the clutch drum 13. A clutch hub 24 is splined to the intermediate shaft 2, and circumferentially of the clutch hub 24 there are driven plates 21 which are splined thereto and disposed in alternate relationship with the drive plates 11 as described previously. A clutch piston 14 is slidably mounted within the clutch drum 13 to define a hydraulic chamber, e.g., an oil pressure chamber between the piston and the drum. A spring bearing member 16 is secured to the clutch drum 13 by means of a snap ring 17, and a return spring 15 is mounted between the clutch piston 14 and the spring bearing member. First clutch means C1 comprises the drive plates 11, driven plates 21, clutch hub 24, clutch piston 14, return spring 15 spring bearing member 16, and clutch drum 13.

Still referring to FIG. 18, the drive plates 12 are slidably splined to the clutch drum 13 circumferentially thereof, and the driven plates 31 are slidably splined to the clutch drum 3 and disposed in alternate relationship with the drive plates 12. A clutch piston 34 is slidably mounted within the clutch drum to define a hydraulic chamber between the piston and the drum. A spring bearing member 36 is secured to the clutch drum 3 by means of a snap ring 37, and between the clutch piston 34 and the spring bearing member 36 there is mounted a return spring 35. The second clutch means C2 comprises the clutch drum 13, drive plates 12, driven plates 31, clutch drum 3, clutch piston 34, return spring 35 and spring bearing member 36. As described with respect to FIG. 1, the input sun gear 22 is secured to the intermediate shaft 2 and the reverse sun gear 32 is secured to the clutch drum 3. The carrier 5 is rotatably mounted within the case 6, and carries thereon a long pinion pin 51. Rotatably mounted on the long pinion pin 51 is a long pinion gear 100. The carrier 5 also carries thereon a short pinion pin 52, on which an idle gear 232 is rotatably mounted. The idle gear 232 meshes with the reverse sun gear 32 and the teeth 132 of the long pinion gear 100. The input sun gear 22 meshes with the teeth 122 of the long pinion gear 100. The output shaft 4 is rotatably carried by the carrier 5 and the output sun gear 41 is secured to the output shaft 4. The output sun gear 41 is engaged by the teeth 141 of the long pinion gear 100. The first brake means B1 is arranged to fix the clutch drum 3 to the case 6 and the second brake means B2 is arranged to fix the carrier 5 to the case 6.

Referring to FIG. 19, the drive gear 42 is secured to the output shaft 4 as described with respect to FIGS. 8-14. The output shaft 44 is rotatably connected to the case 6 and driven from a drive wheel (not shown). The driven gear 43 is secured to the output shaft 44 and meshes with the drive gear 42. The drum 23 is secured to the intermediate shaft 2, and third brake means B3 is arranged to fix the drum 23 to the case 6.

Figure 8A:
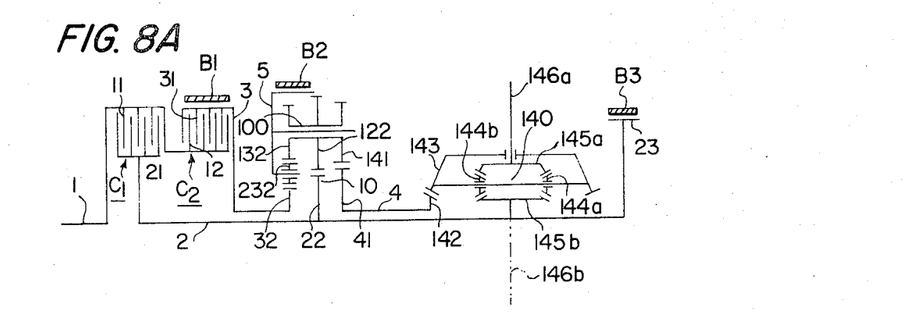
FIG. 8A is a schematic diagram showing the power train according to a second embodiment of the invention.

The second embodiment of the present invention comprises an arrangement as shown in FIG. 8A. A drive gear 142 is secured to the output shaft 4 and meshes with a driven gear 143 which has a pin secured thereto. On that pin there are rotatably mounted gears 144a and 144b which are mesh-engaged by gears 145a and 145b respectively mounted on drive shafts 146a and 146b. The drum 23 is secured to the intermediate shaft 2 and the third brake means B3 is arranged to fix the drum 23 to the case 6.

The second embodiment will now be described with reference to the cross-sectional views thereof as shown in FIGS. 18 and 20. The left-hand portion or planetary gear type speed change device portion of the second embodiment is identical with that of the first embodiment, and FIG. 18 corresponds to the cross-sectional view of the same portion according to this alternative embodiment. FIG. 20 is a cross-sectional view showing the right-hand or output shaft portion of the second embodiment whose power train is schematically shown in FIG. 8a. In FIG. 20, numeral 4 represents the output shaft identical with that indicated by 4 in FIG. 20, 142 the drive gear secured to the output shaft 4, 147 a housing rotatably mounted on the casing 6, and 143 the driven gear secured to the housing 147 and mesh-engaged by the drive gear 142. Numeral 140 designates a pin carried by the housing 147, and 144a and 144b gears rotatably mounted on the pin 140 and engaged by gears 145a and 145b respectively, which in turn are secured to the drive shafts 146a and 146b respectively and driven from a drive wheel (not shown). Numeral 23 designates the drum secured to the intermediate shaft 2, and B3 is the third brake means arranged to fix the drum 23 to the case 6.

The output shaft portion shown in FIG. 19 also forms the output shaft portion of each of the third, fifth, seventh, ninth, 11th and 13th embodiments which will be described later, and the output shaft portion shown in FIG. 20 forms such portion of each of the fourth, sixth, eighth, 10th, 12th and 14th embodiments which will also be described later.

The first example of the power train shown in FIG. 1 will now be compared in operation with the first and second embodiments. In FIG. 1, the input shaft 1 is driven from a prime mover directly or by a torque converter, fluid coupling and clutch means (not shown). If the first clutch means C1 is brought into its engaged position, the input shaft 1 will drive a first input member or intermediate shaft 2 through the first clutch means C1 and accordingly the input sun gear 22 secured to the intermediate shaft 2 is driven. With the carrier 5 fixed to the gear case by the second brake means B2, the drive force of the input sun gear 22 will be transmitted through the teeth 122 of the long pinion gear 100 to the teeth 141 of the same long pinion gear 100 and further to the output sun gear 41 engaging the teeth 141, whereby the output shaft 4 is rotated to provide a first speed change ratio. Subsequently, with the first clutch means C1 in the engaged position, the second brake means B2 is released and the first brake means B1 is actuated to fix a second input member or clutch drum 3 to the gear case. As a result, the drive force of the first input member or input sun gear 22 is transmitted to the long pinion gear 100 and idle gear 232, whereby these two gears revolve about the reverse sun gear 32 and the carrier 5 also rotates. The output sun gear 41 engaging the rotating and revolving long pinion gear 100 is rotated thereby, whereby the output shaft 4 connected to the output sun gear is provided with a second speed change ratio. With the first clutch means C1 still in the engaged position, the first brake means B1 is subsequently released and the second clutch means C2 is actuated to engage the clutch drum 3 with the input shaft 1, whereby the input gear 22 and reverse gear 32 are driven together to thereby prevent the gears of the planetary gear train 10 from rotating relative to one another and bring these gears into directly connected relationship, whereby the input shaft 1 and output shaft 4 effect the same rotation to provide a third speed change ratio. The first clutch means C1 is then released and the second clutch means C2 is brought into its engaged position to transmit the drive force from the input shaft 1 to the second input member or clutch drum 3 and reverse sun gear 32 while the second brake means B2 is actuated to fix the carrier 5 to gear case, whereby the drive force of the reverse sun gear 32 is transmitted through the idle gear 232 to the teeth 132 and teeth 141 of the long pinion gear 100 and further to the output sun gear 41 engaging the teeth 141. Thus, the output shaft 4 is now rotated in the opposite direction to provide a reverse speed change ratio.

The operation of the first and second embodiments of the present invention will now be explained. FIGS. 8 and 8A the second clutch means C2 is brought into its engaged position to transmit the drive force of the input shaft 1 to the second input member or clutch drum 3 and reverse sun gear 32. The third brake means B3 is actuated so that the drum 23 secured to the first input member or intermediate shaft 2 is engaged with the gear case, whereby the drive force of the reverse sun gear 32 is transmitted through the idle gear 232 to the teeth 132 of the long pinion gear 100. With the rotation of the long pinion gear 100, the teeth 122 thereof rotates and revolves about the input sun gear 22 engaged with the case by the third brake means B3, and the carrier 5 is also rotated in the same direction. The drive force is further transmitted to the output sun gear 41 engaging the teeth 141 of the rotating and revolving long pinion gear 100, whereby the output shaft 4 is provided with a first speed change ratio. The second, third and fourth speeds provided in the FIGS. 8 and 8A arrangement correspond to the first, second and third speeds provided by the FIG. 1 arrangement, and the reverse speed change ratio is the same as described with respect to FIG. 1.

The drive force thus provided in each speed change step according to the first embodiment is transmitted, as noted in FIG. 8, from the drive gear 42 secured to the output shaft 4 through the driven gear 43 engaging therewith to the output shaft 44, and further through a propeller shaft and a differential means to unshown drive wheel (not shown), which thus drives the vehicle.

The drive force in each speed change step according to the second embodiment is transmitted, as noted in FIG. 8A, through differential means 140 to the output shafts 146a and 146b which thus drive the vehicle.

Figure 2:
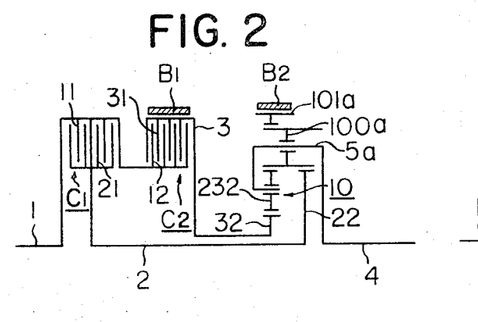
Figure 9:
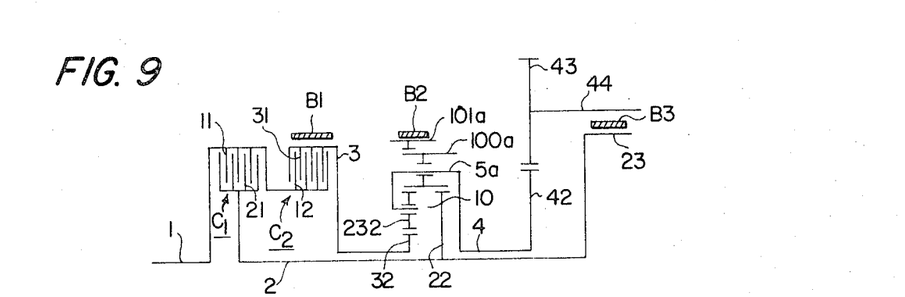
FIG. 9 is a schematic diagram showing the power train according to a third embodiment of the invention.

The third and fourth embodiments of the invention will now be described. FIG. 2 shows the second example of the power train used with the existing typical planetary gear type speed change device. In FIG. 2, numeral 1 denotes an input shaft, 11 drive plates splined to the input shaft 1, 2 an intermediate shaft, and 21 driven plates splined to the intermediate shaft 2 and disposed in alternate relationship with the drive plates 11. The drive plates 11 and driven plates 21 together form first clutch means C1. Numeral 12 designates drive plates splined to the input shaft 1, 3 a clutch drum and 31 driven plates splined to the clutch drum 3 and disposed in alternate relationship with the drive plates 12. The drive plates 12 and driven plates 31 together form second clutch means C2. Numeral 22 designates an input sun gear secured to the intermediate shaft 2, 32 a reverse sun gear secured to the clutch drum 3, and 5a a carrier for carrying a short pinion gear 232 for rotation on a pin of the carrier, the short pinion gear 232 engaging with the reverse sun gear 32. Numeral 100a represents a long pinion gear carried by the carrier 5a for rotation on a pin thereof and engaging the short pinion gear 232 and input sun gear 22, and 101a is a ring gear engaging the long pinion gear 100a. B1 denotes first brake means arranged to fix the clutch drum 3, and B2 second brake means arranged to fix the ring gear 101a. Numeral 4 represents an output shaft secured to the carrier 5a. The third embodiment is shown in FIG. 9, the input portion of which is similar to FIG. 2. The fourth embodiment is shown in FIG. 9A.

The operation of the power train will now be described by way of comparison between the second example shown in FIG. 2 and the third and fourth embodiments of the present invention. In FIG. 2, the input shaft 1 is driven from a prime mover in the same way as described with respect to FIG. 1. If the first clutch means C1 is brought into its engaged position, the input shaft 1 will drive a first input member or intermediate shaft 2 via the first clutch means C1 and accordingly drive the input sun gear 22 secured to the intermediate shaft 2. If the ring gear 101a is fixed to the gear case by the second brake means B2, the long pinion gear 100a engaging the input sun gear 22 will be rotated in the opposite direction to the input shaft 1 while revolving in the same direction therewith due to the engagement with the ring gear 101a. This revolution of the input sun gear 22 causes the carrier 5a to rotate to thereby provide the output shaft with a first speed change ratio. With the first clutch means C1 in the engaged position, the second brake means B2 is then released to fix a second input member or clutch drum 3 and reverse sun gear 32 to the gear case, whereby the drive force from the input sun gear 22 is transmitted through the long pinion gear 100a engaging therewith and through the idle gear 232 engaging the gear 100a to the reverse sun gear 32. Thus, the idle gear 232 is caused to rotate and revolve in the same direction as the input shaft 1. This rotation of the idle gear causes the carrier 5a to rotate to thereby provide the output shaft 4 with a second speed change ratio. With the first clutch means C1 still in the engaged position, the first brake means B1 is subsequently released and the second clutch means C2 is actuated to engage the second input member or clutch drum 3 with the input shaft 1, so that the input sun gear 22 and reverse sun gear 32 are driven together to prevent the gears of the planetary gear train 10 from rotating relative to one another. Thus the input shaft 1 and output shaft 4 effect the same rotation to provide a third speed change ratio. If the first clutch means C1 is released and the second clutch means is brought into its engaged position to thereby transmit the drive force of the input shaft 1 to the second input member or clutch drum 3 and reverse sun gear 32, and the second brake means B2 is actuated to fix the ring gear 101a to the gear case, then the drive force of the reverse sun gear 32 will be transmitted through the idle gear 232 to the long pinion gear 100a, which is thus caused to rotate in the same direction as the input shaft 1 but revolve in the opposite direction because the long pinion gear 100a is in engagement with the ring gear 101a fixed in the described manner. This rotation of the long pinion gear 101a causes the carrier 5a to rotate to thereby provide the output shaft 4 with a reverse speed change ratio.

Figure 9A:
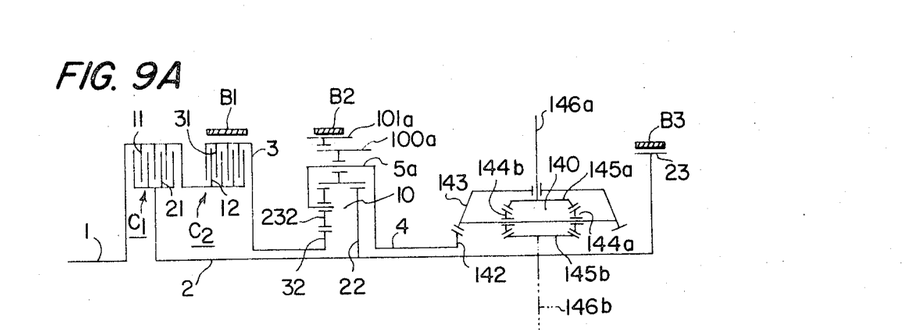
FIG. 9A is a schematic diagram showing the power train according to a fourth embodiment of the invention.

The operation will now be described with respect to the third and fourth embodiments of the present invention as shown in FIGS. 9 and 9A. The second clutch means C2 is first brought into its engaged position to transmit the drive force of the input shaft 1 to the second input member or clutch drum 3 and reverse sun gear 32, and the third brake means B3 is actuated to fix to the gear case the drum 23 secured to the first input member or intermediate shaft 2. Thus the drive force of the reverse sun gear 32 is transmitted through the idle gear 232 engaging therewith to the long pinion gear 100a engaging the gear 232, whereby the long pinion gear 100a is caused to rotate and revolve around the input sun gear 22 in the same direction as the input shaft 1. The revolution of the long pinion gear 100a causes the carrier 5a to rotate to thereby provide the output shaft 4 with a first speed change ratio. The second, third and fourth speeds provided in the embodiments of FIGS. 9 and 9A correspond to the first, second and third speeds provided by the FIG. 2 arrangement, and the reverse speed change ratio is the same as described with respect to FIG. 2.

Figure 3:
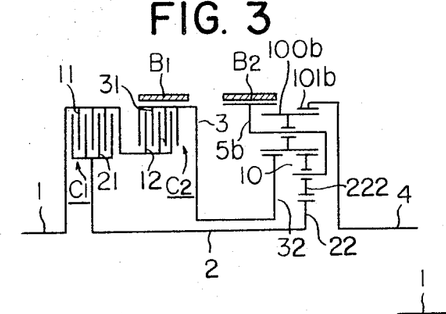

The fifth and sixth embodiments of the present invention will now be described. Referring to FIG. 3 which shows the third example of the power train used with the existing typical planetary gear type speed change device, numeral 1 designates an input shaft, 11 drive plates splined to the input shaft 1, 2 an intermediate shaft, and 21 driven plates splined to the intermediate shaft 2 and disposed in alternate relationship with the drive plates 11. The drive plates 11 and driven plates 21 together form first clutch means C1. Numeral 12 denotes drive plates splined to the input shaft 1, 3 a clutch drum, and 31 driven plates splined to the clutch drum 3 and disposed in alternate relationship with the drive plates 12. The drive plates 12 and driven plates 31 together form second clutch means C2. Numeral 22 designates an input sun gear secured to the intermediate shaft 2, 5b a carrier, 222 a short pinion gear mounted for rotation on a pin of the carrier 5b and engaging the input sun gear 22, 32 a reverse sun gear secured to the drum 3, 100b a long pinion gear mounted for rotation on a pin of the carrier 5b and engaging the short pinion gear 222 and reverse sun gear 32, and 101b a ring gear engaging the long pinion gear 100b. Numeral 4 denotes an output shaft secured to the ring gear 101b, and B1 and B2 respectively denote first brake means for fixing the clutch drum 3 and second brake means for fixing the carrier 5b.

Figure 10:
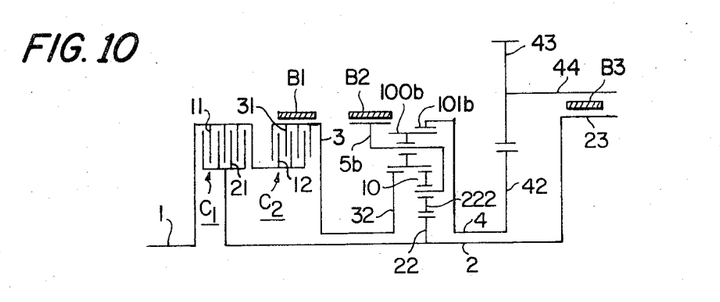
FIG. 10 is a schematic diagram showing the power train according to a fifth embodiment of the invention.
Figure 10A:
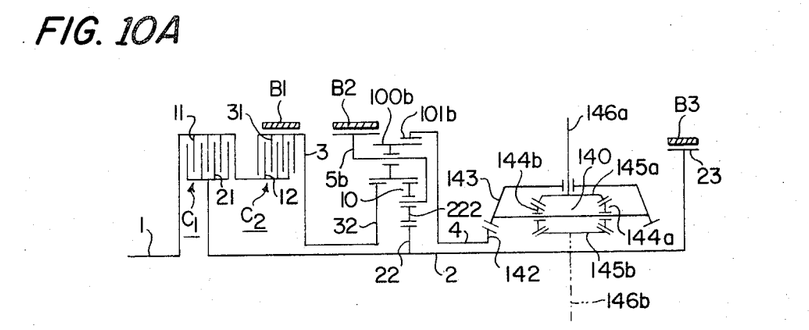
FIG. 10A is a schematic diagram showing the power train according to a sixth embodiment of the invention.

Comparison will be made in operation between the third example shown in FIG. 3 and the fifth and sixth embodiments as shown in FIGS. 10 and 10a. In FIG. 3, the input shaft 1 is driven from a prime mover in the manner described with respect to FIG. 1. When the first clutch means C1 is brought into its engaged position, the input shaft 1 drives a first input member or intermediate shaft 2 through the first clutch means C1 and accordingly drives the input sun gear 22 secured to the intermediate shaft 2. If the second brake means B2 is actuated to fix the carrier 5b to the gear case, the drive force will be transmitted through the short pinion gear 222 engaging the input sun gear 22 to the long pinion gear 100b engaging the gear 222 and further to the ring gear 101b engaging the gear 100b, whereby the output shaft 4 secured to the ring gear 101b is provided with a first speed ratio. With the first clutch means C1 remaining in the engaged position, the second brake means B2 may then be released and the first brake means B1 is actuated to secure to the gear case a second input member or clutch drum 3 and reverse sun gear 32, whereby the drive force from the input sun gear 22 is transmitted through the short pinion gear 222 engaging therewith to the long pinion gear 100b, which in turn is caused to rotate and revolve on the reverse sun gear 32 in the same direction as the input shaft 1. Thus the output shaft 4 engaged by the long pinion gear 100b is provided with a second speed change ratio. With the first clutch means C1 still in the engaged position, the first brake means B1 is subsequently released and the second clutch means C2 is actuated to engage a second input member or the clutch drum 3 with the input shaft 1 to thereby drive the input sun gear 22 and reverse sun gear 32 together so as to prevent the gears of the planetary gear train 10 from rotating relative to one another. Thus the input shaft 1 and output shaft 4 effect the same rotation to provide a third speed change ratio. When the first clutch means C1 is then released and the second clutch means C2 is brought into its engaged position to transmit the drive force of the input shaft 1 to the second input member or clutch drum 3 and reverse sun gear 32, and the second brake means B2 is actuated to fix the carrier 5b to the gear case, then the drive force of the reverse sun gear 32 is transmitted to the long pinion gear 100b which drives the ring gear 101b engaging therewith, whereby the output shaft 4 is provided with a reverse speed change ratio.

The operation of the fifth and sixth embodiments of the present invention will now be described with reference to FIGS. 10 and 10A. The second clutch means C2 is first brought into engaged position to transmit the drive force of the input shaft 1 to the second input member or clutch drum 3 and reverse sun gear 32, and the third brake means B3 is actuated so that the drum 23 secured to the first input member or intermediate shaft 2 is fixed to the gear case. Thereupon the drive force of the reverse sun gear 32 is transmitted through the long pinion gear 100b engaging therewith to the short pinion gear 222 engaging the gear 100b, whereby the short pinion gear 222 rotates and revolves on the input sun gear 22 in the same direction as the input shaft 1. The revolution of the short pinion gear 222 causes the ring gear 101b to rotate to thereby provide the output shaft 4 with a first speed change ratio. The second, third and fourth speeds provided in the arrangements of FIGS. 10 and 10a correspond to the first, second and third speeds provided in the FIG. 3 arrangement, and the reverse speed change ratio is the same. The manner in which the drive force in each speed change step according to the fifth and sixth embodiments is the same as in the first and second embodiments.

Figure 4:
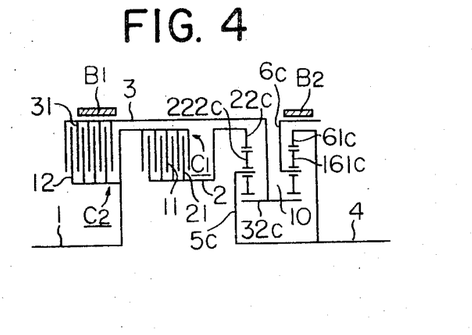

The seventh and eighth embodiments of the present invention will now be described. FIG. 4 shows the fourth example of the power train used with the existing typical planetary gear type speed change device. Numeral 1 designates an input shaft, 11 drive plates splined to the input shaft 1, 2 an intermediate shaft and 21 driven plates splined to the intermediate shaft 2 and disposed in alternate relationship with the drive plates 11. The drive plates 11 and driven plates 21 together form first clutch means C1. Numeral 12 denotes drive plates splined to the input shaft 1, 3 a clutch drum and 31 driven plates splined to the clutch drum 3 and disposed in alternate relationship with the drive plates 12. The drive plates 12 and driven plates 31 together form second clutch means C2. Numeral 22c designates a ring gear secured to the intermediate shaft 2, 32c a reverse sun gear secured to the drum 3, 5c a carrier, 222c a pinion gear mounted for rotation on the pin of the carrier 5c and engaging the ring gear 22c and reverse sun gear 32c, 6c another carrier, 161c a pinion gear mounted for rotation on a pin of the carrier 6c and engaging the reverse sun gear 32c, 61c a ring gear engaging the pinion gear 161c, and 4 an output shaft secured to the carrier 5c and ring gear 61c. B1 and B2 represent first brake means arranged to fix the clutch drum 3 and second brake means arranged to fix the carrier 6c, respectively.

Figure 11:
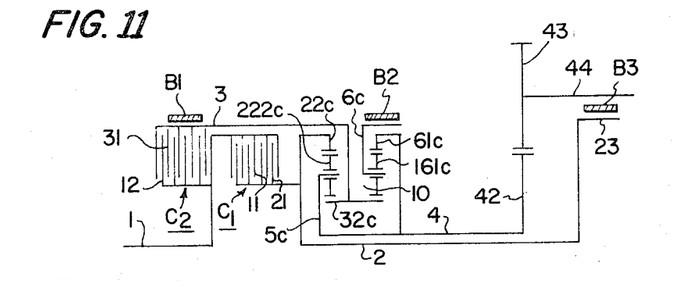
FIG. 11 is a schematic diagram showing the power train according to a seventh embodiment of the invention.
Figure 11A:
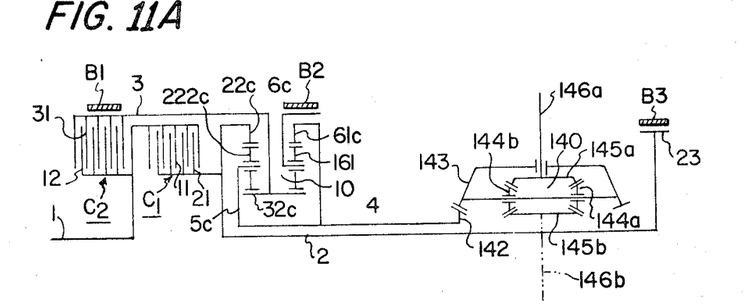
FIG. 11A is a schematic diagram showing the power train according to an eighth embodiment of the invention.

The operation will be described by way of comparison between the fourth example shown in FIG. 4 and the seventh and eighth embodiments as shown in FIGS. 11 and 11a. In FIG. 4, the input shaft 1 is driven from a prime mover as in the case of FIG. 1. If the first clutch means C1 is brought into engaged position, the input shaft 1 will drive the first input member or intermediate shaft 2 via the first clutch means C1 and accordingly drive the ring gear 22c secured to the intermediate shaft 2. If the second brake means B2 is then actuated to secure the carrier 6c to the gear case, the drive force will be transmitted through the pinion gear 222c engaging the ring gear 22c to the reverse sun gear 32c and further through the pinion gear 161c engaging therewith to the ring gear 61c. The drive force is then transmitted to the output shaft 4, which is thereby provided with a first speed change ratio. With the first clutch C1 remaining in the engaged position, the second brake means B2 is subsequently released and the first brake means B1 is actuated so that the second input member or clutch drum 3 and reverse sun gear 32c are fixed to the gear case. Thereupon the drive force from the ring gear 22c is transmitted to the pinion gear 222c engaging therewith, whereby the pinion gear 222c is rotated and revolved on the reverse sun gear 32c in the same direction as the input shaft 1. The revolution of the pinion gear 222c causes the carrier 5c to rotate to thereby provide the output shaft 4 with a second speed change ratio. With the first clutch means C1 still in the engaged position, the first brake means B1 is then released and the second clutch means C2 is actuated to engage the second input member or clutch drum 3 with the input shaft 1, whereby the ring gear 22c and reverse sun gear 32c are driven together to prevent the gears of the planetary gear train 10 from rotating relative to one another. Thus the input shaft 1 and output shaft 4 effect the same rotation to provide a third speed change ratio. The first clutch means C1 is subsequently released and the second clutch means C2 is brought into the engaged position to transmit the drive force from the input shaft 1 to the second input member or clutch drum 3 and reverse sun gear 32c and the carrier 6c is fixed to the gear case by the second brake means B2. Thereupon the drive force of the reverse sun gear 32c is transmitted through the pinion gear 161c to the ring gear 61c engaging therewith, whereby the output shaft 4 is provided with a reverse speed change ratio.

The seventh and eighth embodiments will now be described. The second clutch means C2 is brought into engaged position to transmit the drive force from the input shaft 1 to the second input member or clutch drum 3 and reverse sun gear 32c and the third brake means B3 is actuated so that the drum 23 secured to the first input member or intermediate shaft 2 is fixed to the gear case. Thereby the drive force of the reverse sun gear 32c is transmitted to the pinion gear 222c engaging therewith and thus the pinion gear 222c is caused to rotate within the ring gear 22c now fixed to the said case in the opposite direction to the input shaft 1 while revolving in the same direction as the input shaft 1. The revolution of the pinion gear 222c causes the carrier 5c to rotate to thereby provide the output shaft 4 with a first speed change ratio. The second, third and fourth speeds provided in the arrangements of FIGS. 11 and 11A correspond to the first, second and third speeds described above with respect to FIG. 4, and the reverse speed change ratio is the same. The manner in which the drive force provided in each speed change step according to the seventh and eighth embodiments is the same as described with respect to the first and second embodiments.

Figure 5:
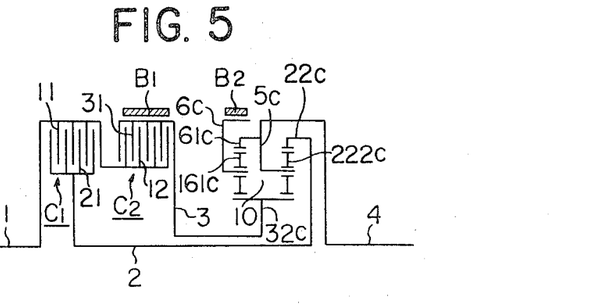
Figure 12:
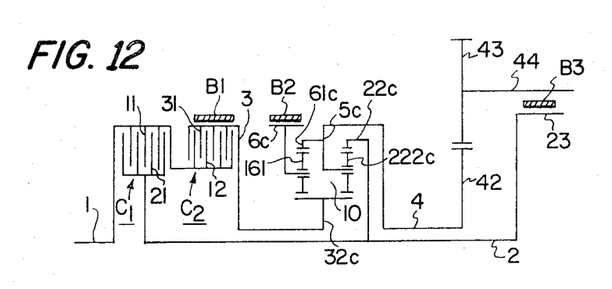
FIG. 12 is a schematic diagram showing the power train according to a ninth embodiment of the invention.
Figure 12A:
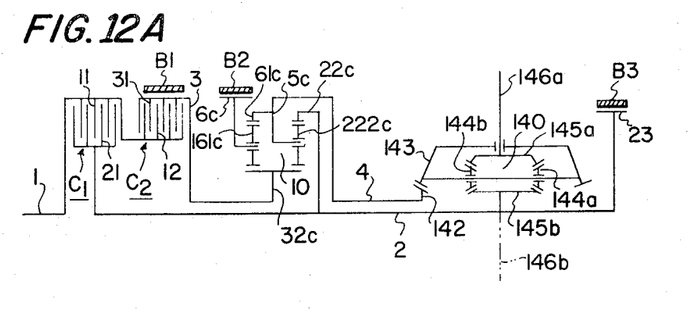
FIG. 12A is a schematic diagram showing the power train according to a 10th embodiment of the invention.

The ninth and 10th embodiments of the present invention will now be described. FIG. 5 shows the fifth example of the power train used with the existing typical planetary gear type speed change device and this example is the same in arrangement as the fourth example shown in FIG. 4. The ninth embodiment is shown in FIG. 12, and the tenth embodiment is illustrated in FIG. 12A, which are similar arrangements to that of FIG. 5 except for the output portion or each of these power trains. Also, these ninth and 10th embodiments are similar in operation to the previously described seventh and eighth embodiments.

The operational sequence of the various clutch means and brake means in each speed change step for the first to tenth embodiments as shown in FIGS. 8 to 12 is shown in the chart of FIG. 15.

Figure 6:
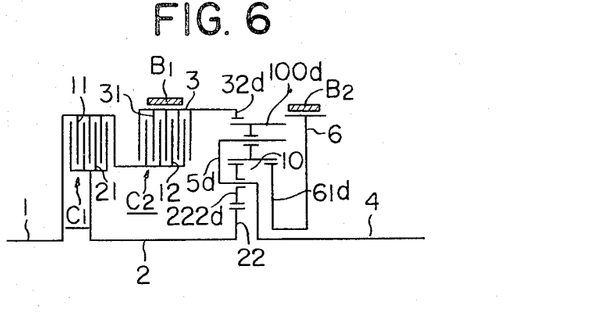
Figure 13:
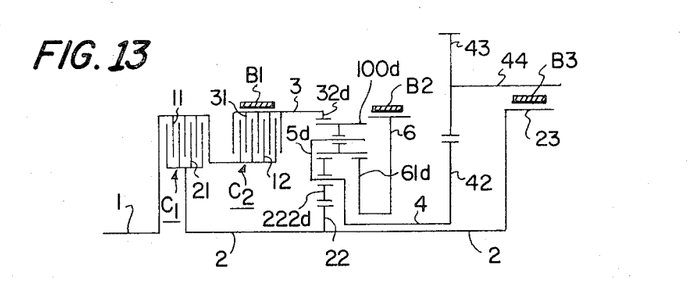
FIG. 13 is a schematic diagram showing the power train according to an 11th embodiment of the invention.
Figure 13A:
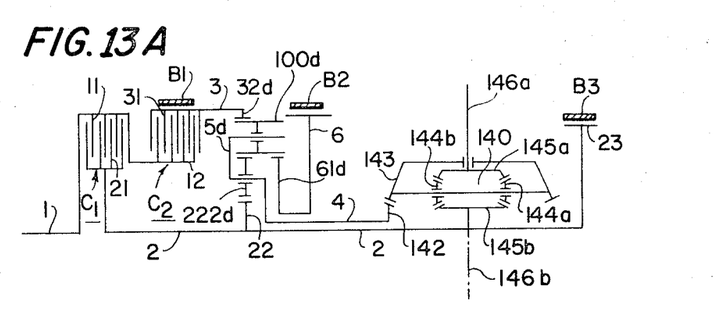
FIG. 13A is a schematic diagram showing the power train according to a 12th embodiment of the invention.

The 11th and 12th embodiments of the present invention will now be described. FIG. 6 shows the sixth example of the power train used with the existing typical planetary gear type speed change device. In FIG. 6, there are shown an input shaft 1, drive plates 11 splined to the input shaft 1, an intermediate shaft 2 and driven plates 21 splined to the intermediate shaft 2 and disposed in alternate relationship with the drive plates 11. The drive plates 11 and driven plates 21 together form first clutch means C1. There are also provided drive plates 12 splined to the input shaft 1, a clutch drum 3 and driven plates 31 splined to the clutch drum 3 and disposed in alternate relationship with the drive plates 12. The drive plates 12 and driven plates 31 together form second clutch means C2. Further provided are an input sun gear 22 secured to the intermediate shaft 2, a ring gear 32d secured to the clutch drum 3, a carrier 5d, a short pinion gear 222d mounted for rotation on a pin of the carrier 5d and engaging a input sun gear 22, a long pinion gear 100d mounted for rotation on the pin of the carrier 5d and engaging each of the short pinion gear 222d and ring gear 32d,; and a forward sun gear 61d engaging the long pinion gear 100d. First brake means B1 is arranged to fix the clutch drum 3. A drum 6 is secured to the forward sun gear 61d, and second brake means B2 is arranged to fix the drum 6. An output shaft 4 is connected to the carrier 5d. The eleventh embodiment is shown in FIG. 13, and the 12th embodiment is illustrated in FIG. 13A, the arrangements of which are similar to that of FIG. 6 except for the output portion of each of the power trains.

The operation will now be described by way of comparison between the sixth example of the conventional power train shown in FIG. 6 and the 11th to 12th embodiments of the present invention. In FIG. 6, the input shaft 1 is driven from a prime mover as in the case of FIG. 1. If the first clutch means C1 is brought into engaged position, the input shaft 1 will drive the first input member or intermediate shaft 2 via the first clutch means C1 and accordingly drive the input sun gear 22 secured to the intermediate shaft 2. If the second brake means B2 is actuated so that the drum 6 secured to the forward sun gear 61d is secured to the gear case, the drive force of the input sun gear 22 will be transmitted through the short pinion gear 222d engaging therewith to the long pinion gear 100d engaging the pinion gear 222d, whereby the long pinion gear 100d is caused to rotate and revolve on the forward sun gear 61d secured to the gear case in the same direction as the input shaft 1. This revolution of the long pinion gear 100d causes the carrier 5d to rotate to thereby provide the output shaft 4 with a first speed change ratio. With the second brake means in its engaged position, the first clutch means C1 is released and the second clutch means C2 is brought into its engaged position, whereby the input shaft 1 drives the second input member or clutch drum 3 and ring gear 32d through the second clutch means C2. The rotation of the clutch drum 3 and ring gear 32d causes the long pinion gear 100d engaging the ring gear 32d to rotate, whereby the long pinion gear 100d is caused to rotate and revolve on the forward sun gear 61d secured to the gear case in the same direction as the input shaft 1. Such revolution also causes the carrier 5d to rotate to thereby provide the output shaft 4 with a second speed change ratio. Now with the second clutch means C2 in its engaged position, the second brake means B2 is released and the first clutch means C1 is engaged, the ring gear 32d and input sun gear 22 are driven together to prevent the gears of the planetary gear train 10 from rotating relative to one another. Thus the input shaft 1 and output shaft 4 effect the same rotation to thereby provide a third speed change ratio. Subsequently the first clutch means C1 is engaged and the first brake means B1 is actuated to fix the clutch drum 3 to the gear case, whereby the drive force of the input sun gear 22 is transmitted to the short pinion gear 222d engaging therewith and further to the long pinion gear 100d engaging the pinion gear 222d. Thus the long pinion gear 100d is caused to rotate within the ring gear 32d fixed to the gear case in the same direction as the input shaft while revolving in the opposite direction. Such revolution of the long pinion gear 100d causes the carrier 5d to rotate to thereby provide the output shaft with a reverse speed change ratio.

The 11th and 12th embodiments of the present invention will now be described with reference to FIGS. 13 and 13A. The second clutch means C2 is first brought into engaged position to transmit the drive force from the input shaft 1 to the second input member or clutch drum 3 and ring gear 32d and the third brake means B3 is actuated so that the drum 23 secured to the first input member or intermediate shaft 2 is fixed to gear case. Thereby the drive force of the ring gear 32d is transmitted through the long pinion gear 100d engaging therewith to the short pinion gear 222d engaging the pinion gear 100d, whereby the short pinion gear 222d is caused to rotate on the input sun gear 22 secured to the gear case in the same direction to the input shaft 1 while revolving in the same direction as the input shaft. Such revolution of the short pinion gear 222d causes the carrier 5 d to rotate to thereby provide the output shaft 4 with a fourth speed change ratio. The first to third speeds provided in the arrangement of FIGS. 13 and 13A correspond to the first to third speeds in the FIG. 6 arrangement. The reverse speed change ratio is the same as described with respect to FIG. 6. The manner in which the drive force in each speed change step according to the 11th and 12th embodiments is transmitted to drive the vehicle is the same as described with respect to the first and second embodiments. The operational sequence of the clutch means and brake means in each speed change step according to the 11th and 12th embodiments is shown in the chart of FIG. 16.

Figure 7:
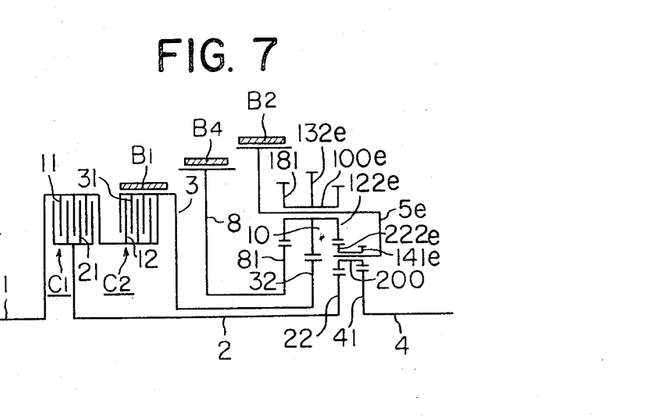
Figure 14:
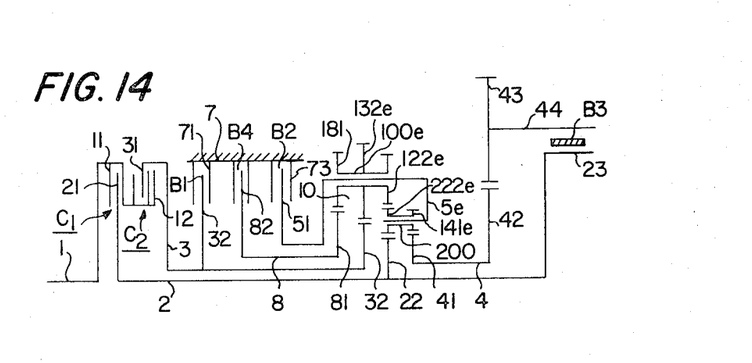
FIG. 14 is a schematic diagram showing the power train according to a 13th embodiment of the invention.
Figure 14A:
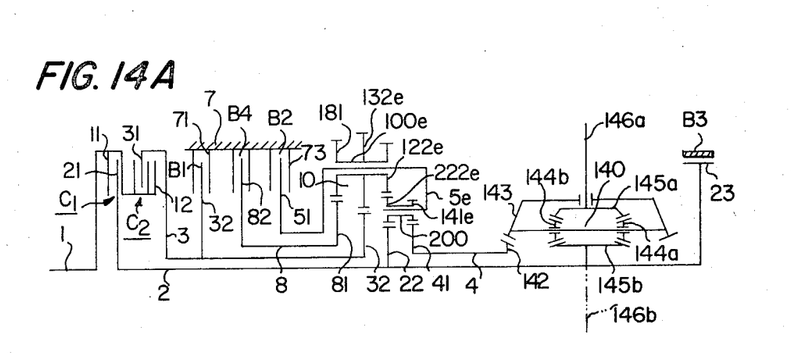
FIG. 14A is a schematic diagram of the power train according to a 14th embodiment of the invention.

The 13th and 14th embodiments of the present invention will be described by way of comparison with the seventh example of the power train used with the existing typical planetary gear type speed change device as shown in FIG. 7. This example of the power train includes an input shaft 1, drive plates 11 splined to the input shaft 1, an intermediate shaft 2, and driven plates 21 splined to the intermediate shaft 2 and disposed in alternate relationship with the drive plates 11. The drive plates 11 and driven plates 21 together form first clutch means C1. There are further provided drive plates 12 splined to the input shaft 1, a clutch drum 3, and driven plates 31 splined to the clutch drum 3 and disposed in alternate relationship with the drive plates 12. The drive plates 12 and driven plates 31 together form second clutch means C2. The power train also includes an input sun gear 22 secured to the intermediate shaft 2, a reverse sun gear 32 secured to the clutch drum 3, a carrier 5e, an idle gear 200 mounted for rotation on a pin of the carrier 5e and having teeth 222e engaging the input sun gear 22, and a long pinion gear 100e mounted for rotation on a pin of the carrier 5e and having teeth 122e engaging the teeth 222e of the idle gear 200. The long pinion gear also has teeth 132e engaging the reverse sun gear 32 and teeth 181 engaging a sun gear 81. The power train further includes fourth brake means B4, a drum 8 arranged to be fixed to the gear case by the fourth brake means B4 and formed integrally with the sun gear 81, an output shaft 4, and an output sun gear 41 secured to the output shaft 4 and engaged by the teeth 141e of the idle gear 200. Second brake means B2 is arranged to fix to the gear case the carrier 5e carrying thereon the idle gear 200 and long pinion gear 100e, and first brake means is arranged to fix to the gear case the clutch drum 3 integral with the reverse sun gear 32. The 13th embodiment is shown in FIG. 14, and the fourteenth embodiment is illustrated in FIG. 14A, these arrangements being similar to FIG. 7 except for the output portions of the power trains.

In operating the power train of FIG. 7, the input shaft 1 is driven from a prime mover in the same way as described with respect to FIG. 1. The first clutch means C1 is engaged so that the input shaft 1 drives the first input member or intermediate shaft 2 via the first clutch means C1 and accordingly drives the input sun gear 22 secured to the intermediate shaft 2. If the second brake means B2 is actuated to fix the carrier 5e to the gear case, the drive force of the input sun gear 22 is transmitted to the teeth 222e of the idle gear 200 engaging the input sun gear 22 so that the teeth 141e of the idle gear 200 drives the output sun gear 41, whereby the output shaft 4 is provided with a first speed change ratio. Next, with the first clutch means C1 remaining in the engaged position, the second brake means B2 is released and the fourth brake means B4 is actuated to fix to the gear case the drum 8 secured to the sun gear 81, whereby the drive force from the input sun gear 22 drives the teeth 222e of the idle gear 200 engaging therewith and is further transmitted to the teeth 122e of the long pinion gear 100e engaging the teeth 222e. Thus the long pinion gear 100e is caused to rotate and revolve on the sun gear 81 fixed to the gear case and engaging the teeth 181 of the long pinion gear 100e, in the same direction as the input shaft 1. Such rotation and revolution of the idle gear 200 drives the output sun gear 41 in engagement with the teeth 141e of the idle gear 200 to thereby provide the output shaft 4 with a second speed change ratio. With the first clutch means C1 still in the engaged position, the fourth brake means B4 is released and the first brake means B1 is actuated to fix to the gear case the second input member or clutch drum 3 and reverse sun gear 32, so that the drive force from the input sun gear 22 drives the teeth 122e of the long pinion gear 100e via the teeth 222e of the idle gear 200 engaging the input sun gear 22. As it receives the drive force, the long pinion gear 100e is caused to rotate and revolve on the reverse sun gear 32 fixed to the gear case and engaging the teeth 132e of the long pinion gear 100e, in the same direction as the input shaft 1. The revolution of the long pinion gear 100e causes the carrier 5e to rotate and accordingly the idle gear 200 on the carrier 5e revolves in the same way. Thus the output sun gear engaging the tooth 141e of the idle gear 200 has a rotational force imparted thereto and thereby the output shaft 4 is provided with a third speed change ratio. With the first clutch means C1 still in the engaged position, the first brake means B1 is then released and the second clutch means C2 is actuated to engage the second input member or clutch drum 3 with the input shaft 1 so that the input sun gear 22 and reverse sun gear 32 are driven together to prevent the gears of the planetary gear train 10 from rotating relative to one another. Thus the input shaft 1 and output shaft 4 effect the same rotation to thereby provide a fourth speed change ratio. Subsequently, if the first clutch means C1 is released and the second clutch means C2 is engaged to transit the drive force from the input shaft 4 to the second input member or clutch drum 3 and reverse sun gear 32, and the second brake means B2 is actuated to secure the carrier 5e to the gear case, then the drive force of the reverse sun gear 32 is transmitted to the teeth 132e of the long pinion gear 100e engaging therewith and further to the teeth 122e of the same gear 100e, whereby the teeth 222e of the idle gear 200 engaging the teeth 122e and the teeth 141e of the same idle gear are driven to rotate the output sun gear 41 engaging the teeth 141e. Thus the output shaft 4 secured to the output sun gear 41 is provided with a backing speed change ratio.

The operation of the 13th and 14th embodiments of the present invention will now be described. In FIGS. 14 and 14A, the second clutch means C2 is first brought into engaged position to transmit the drive force from the input shaft 1 to the second input member or clutch drum 3 and reverse sun gear 32. The third brake means B3 is then actuated to fix to the gear case the drum 23 secured to the first input member or intermediate shaft 2. Thereupon the drive force of the reverse sun gear 32 drives the teeth 132e of the long pinion gear 100e engaging therewith and is further transmitted to the teeth 122e of the long pinion gear 100e to drive the teeth 222e of the idle gear 200 engaging therewith. The idle gear 200 is thus driven to rotate and revolve in the same direction as the input shaft 1 on the input sun gear 22 fixed to the gear case and engaging the teeth 222e of the idle gear 200. This causes the rotation of the output sun gear 41 engaging the teeth 141e of the idle gear 200 to thereby provide the output shaft 4 with a first speed change ratio. The second, third, fourth and fifth speeds attained by the arrangements of FIGS. 14 and 14A correspond to the first, second, third and fourth speeds attained by the arrangement of FIG. 7, and the reverse speed change ratio is similar to that described with respect to the FIG. 7 arrangement. The manner in which the drive force in each speed change step according to the 13th and 14th embodiments is transmitted to drive the vehicle is the same as in the first and second embodiments. The operational sequence of the clutch means and brake means in each speed change step for the 13th and 14th embodiments is shown in the chart of FIG. 19.

In the illustrated various embodiments of the present invention, the clutch means have been shown as multi-plate clutch structure. It will be apparent that the same result may be obtained by using other clutch structure such as single-plate clutch, conical clutch, hub clutch or electromagnetic clutch. Also, the brake means have been shown and described as band brake structure, but the same result may be attained by using other brake structure such as single- or multi-plate brake, conical brake, hub or pawl brake, or electromagnetic brake.

As hereinbefore described, the present invention enables the speed change gear device to attain a greater speed change ratio or a greater number of speed change steps in a simple manner and without increasing the number of required parts, thereby providing greater accelerating force or tractive force for a vehicle whose prime mover has a small output. In the conventional planetary gear type speed change device, to increase the speed change step by one step it was necessary that the number of gears in the composite or single planetary gear train be increased and additional mating members be provided, whereas the present invention eliminates the need to increase the planetary gears and only requires additional brake means to be provided to fix one input member in the conventional planetary gears. This leads to a lower cost and simpler procedures involved to provide the entire device.

What is claimed is:

1. A speed change gear device consisting essentially of a first and a second clutch means provided between an input and an output shaft disposed concentrically within a gear case, and a planetary gear train having a first and a second input gear member connected, respectively, to said first and second clutch means, an output gear member connected to said output shaft, and a first and second brake means for holding said first and second input gear members, respectively, whereby a combination of speed change ratios of required steps is obtained at the output shaft by selective actuation of said clutch and brake means.

2. A speed change gear device according to claim 1, wherein said planetary gear train comprises three sun gears each of which are independently rotatable, a long pinion having three gear portions in respective engagement with two sun gears and an idle gear, the idle gear being related to one of the sun gears and said long pinion, a carrier rotatably supporting said long pinion and said idle gear, whereby a sun gear engaged with the idle gear is connected to said second clutch means, the remaining two sun gears being connected to said first clutch means and said output shaft, respectively.

3. A speed change gear device according to claim 1, wherein the planetary gear train includes a sun gear, and two sets of a gear train including a pinion gear engaged with the sun gear, a ring gear engaged with the pinion gear, and a carrier rotatably supporting said pinion gear.

4. A speed change gear device according to claim 3, wherein the sun gear is connected to the second clutch means, the ring gear of a first one of said gear trains is connected to the first clutch means, and the carrier of one gear train and the ring gear of the other gear train are connected to the output shaft.

5. A speed change gear device according to claim 3, wherein the sun gear is connected to the second clutch means, the ring gear of the second gear train is connected to the first clutch means, and the ring gear of the first gear train and the carrier of the second gear train are connected to the output shaft.

6. A speed change gear device according to claim 1, wherein the planetary gear train comprises, in combination, four sun gears, each of which are independently rotatable, and idle gear having two integrally formed gear portions in engagement with two of the four sun gears, a long pinion having three integrally formed gear portions in engagement with the remaining two sun gears and said idle gear, respectively, a carrier rotatably supporting the long pinion and the idle gear, one of said two sun gears in engagement with said gear portions of said idle gear being connected to the first clutch means, the remaining one of said two sun gears in engagement with said gear portions of said idle gears being connected to the output shaft, and any one of the remaining two sun gears being connected to the second clutch means.

* * * * *